US011949200B1

(12) United States Patent
Beavers et al.

(10) Patent No.: US 11,949,200 B1
(45) Date of Patent: Apr. 2, 2024

(54) LED CONTROLLER AND WIRING CONNECTOR

(71) Applicant: Birdbones Inc, Pasadena, CA (US)

(72) Inventors: Sammy Beavers, Pasadena, CA (US); Joshua Kubizne, Northridge, CA (US)

(73) Assignee: BirdBones Inc, Pasadena, CA (US)

( * ) Notice: Subject to any disclaimer, the term of this patent is extended or adjusted under 35 U.S.C. 154(b) by 0 days.

(21) Appl. No.: 18/489,622

(22) Filed: Oct. 18, 2023

Related U.S. Application Data

(63) Continuation of application No. 18/487,853, filed on Oct. 16, 2023, which is a continuation-in-part of application No. 18/140,227, filed on Apr. 27, 2023.

(60) Provisional application No. 63/430,579, filed on Dec. 6, 2022.

(51) Int. Cl.
*H01R 9/24* (2006.01)
*H01R 43/16* (2006.01)

(52) U.S. Cl.
CPC ......... *H01R 9/2416* (2013.01); *H01R 9/2466* (2013.01); *H01R 43/16* (2013.01)

(58) Field of Classification Search
CPC ..... H01R 9/2416; H01R 9/2466; H01R 43/16
USPC .......................................................... 439/722
See application file for complete search history.

(56) References Cited

U.S. PATENT DOCUMENTS

| | | | | |
|---|---|---|---|---|
| 8,587,956 | B2 * | 11/2013 | Choutov | H05B 45/325 361/674 |
| 9,666,105 | B2 * | 5/2017 | Cox | G09F 19/22 |
| 9,900,963 | B1 * | 2/2018 | Doll | H05B 45/10 |
| 10,369,924 | B2 * | 8/2019 | Peacock | B60Q 1/46 |
| 10,605,445 | B1 * | 3/2020 | Purbaugh | F21V 23/006 |
| 10,733,930 | B2 * | 8/2020 | Goward | H01L 23/49827 |
| 2022/0379800 | A1 * | 12/2022 | Walasik | B60Q 1/2607 |

* cited by examiner

*Primary Examiner* — Peter G Leigh
(74) *Attorney, Agent, or Firm* — Nolan Heimann LLP; Adam Diament

(57) ABSTRACT

A Light Emitting Diode (LED) controller and wiring connector. The LED controller and wiring connector includes a rib and a plurality of first posts that extends from a first end of the rib. The LED controller and wiring connector includes a plurality of second posts. The plurality of second posts extends from a second end of the rib. The second end is opposite of the first end. The plurality of first posts and the plurality of second posts comprise a plurality of trace systems capable of allowing channel and power distribution from the plurality of first posts to the plurality of posts. One or more first posts of the plurality of first posts are cut to connect to a LED controller. Further, one or more second posts of the plurality of second posts are cut to connect to terminal connectors.

18 Claims, 12 Drawing Sheets

LED CONTROLLER AND WIRING CONNECTOR

CROSS-REFERENCE TO RELATED APPLICATIONS

This application is a continuation of U.S. patent application Ser. No. 18/487,853 to Kubizne et al., file Oct. 16, 2023, which is a continuation-in-part application of U.S. application Ser. No. 18/140,227 to Kubizne et al., filed Apr. 27, 2023, which claims priority to and benefit of U.S. Provisional Patent Application No. 63/430,579 to Kubizne et al., filed Dec. 6, 2022, the contents of which are incorporated in their entirety.

FIELD OF THE DISCLOSURE

The present invention relates to a Light Emitting Diode (LED) controller and wiring connector.

BACKGROUND OF THE INVENTION

It is known that wires are used in a variety of industrial and commercial applications. Typically, the wires are used to transmit electrical signals and power between different components of equipment. Several equipment requires multiple wires to operate them. For example, a Light Emitting Diode (LED) controller requires multiple wires to transmit and emit different colors. FIG. 1 shows an exemplary environment 10 in which a LED controller 12 utilizes multiple wires 14, in accordance with prior art. As can be seen, each wire 14 includes a first connector 16 at one end and a second connector 18 at another end. First connector 16 and second connector 18 indicate male members inserted into LED connector 12 and terminal connectors 20. Here, first connector 16 connects to LED controller 12. Second connector 18 connects to terminal connectors 20. In one example, terminal connectors 20 include phoenix terminal connectors.

As can be seen from FIG. 1, LED controller 12 requires multiple wires 14 to be inserted into terminal connectors. Wires 14 take a lot of time to connect to each of LED controller 12 and terminal connectors 20. Further, human error may cause wires 14 to get connected to incorrect terminals within LED controller 12 and/or terminal connectors 20.

Therefore, there remains a continuing need for improved connectors for wiring.

BRIEF SUMMARY OF THE PRESENT INVENTION

The present invention provides a Light Emitting Diode (LED) controller and wiring connector that connects to an LED controller and terminal connectors and avoids the use of multiple wires.

In one aspect of the present invention, the invention provides a LED controller and wiring connector. The LED controller and wiring connector includes a rib and a plurality of first posts that extends from a first end of the rib. The LED controller and wiring connector includes a plurality of second posts. The plurality of second posts extends from a second end of the rib. The second end is opposite of the first end. The plurality of first posts and the plurality of second posts comprise a plurality of trace systems capable of allowing channel and power distribution the plurality of first posts to the plurality of second posts. One or more first posts of the plurality of first posts are cut to connect to a LED controller. Further, one or more second posts of the plurality of second posts are cut to connect to terminal connectors, such as Phoenix type terminal block connectors.

A trace system of the plurality of trace systems comprises a series connection from a first post of the plurality of first posts to a second post of the plurality of second posts and allows the channel and power distribution.

In one implementation, one or more first posts of the plurality of first posts are cut to connect to a LED controller. Further, one or more second posts of the plurality of second posts are cut to connect to terminal connectors. In one example, the LED controller includes one of a 4 channel controller, a 5 channel controller, a 6 channel controller, a 12 channel controller, and a 24 channel controller. The terminal connectors include Phoenix type terminal block connectors. In one example, the terminal connectors include at least two pin female plug-in screw terminal block connectors.

In another aspect of the present invention, the invention provides a Light Emitting Diode (LED) controller and wiring connector having a rib, a plurality of first posts, a plurality of second posts, and a plurality of third posts. The plurality of first posts extends from a first side of the rib. The plurality of second posts extends from a second side of the rib. The second side is opposite of the first side. The plurality of third posts extends from the rib perpendicularly to the plurality of first posts and the plurality of second posts. The plurality of first posts, the plurality of second posts and the plurality of third posts comprise a plurality of trace systems capable of allowing channel and power distribution from the plurality of first posts and the plurality of second posts to the plurality of third posts.

In one advantageous feature of the present invention, the LED controller and wiring connector presents a faster and more secure connection in building LED controllers and extensions via the terminal connectors without the use of wires.

In another advantageous feature of the present invention, the LED controller and wiring connector provides a series of custom Printed Circuit Board (PCB) breakout boards for use with 5.08 mm Phoenix type terminal block connectors. The LED controller and wiring connector is configured to fit solder type Phoenix screw terminal connectors and interlocking Phoenix screw terminal connectors.

In yet another advantageous feature of the present invention, the LED controller and wiring connector presents a more efficient method for building adapters for LED lighting controllers, motion picture, and entertainment industries.

DETAILED DESCRIPTION OF EMBODIMENTS

Figure 1:
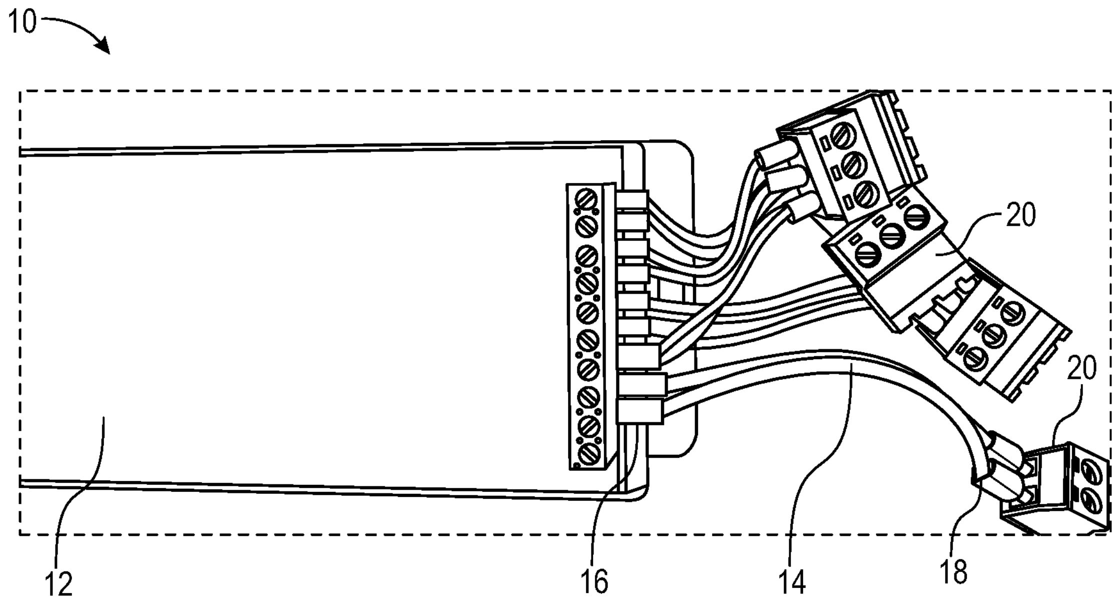
FIG. 1 (Prior Art)
FIG. 1 is an environment in which a LED controller utilizes multiple wires, in accordance with prior art.

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. The numbers, ratios, percentages, and other values may include those that are ±5%, ±10%, ±25%, ±50%, ±75%, ±100%, ±200%, ±500%, or other ranges that do not detract from the spirit of the invention. The terms about, approximately, or substantially may include values known to those having ordinary skill in the art. If not known in the art, these terms may be considered to be in the range of up to ±5%, ±10%, or other value higher than these ranges commonly accepted by those having ordinary skill in the art for the variable disclosed. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein. All patents, patent applications and non-patent literature cited through this application are hereby incorporated by reference in their entireties.

Figure 2:
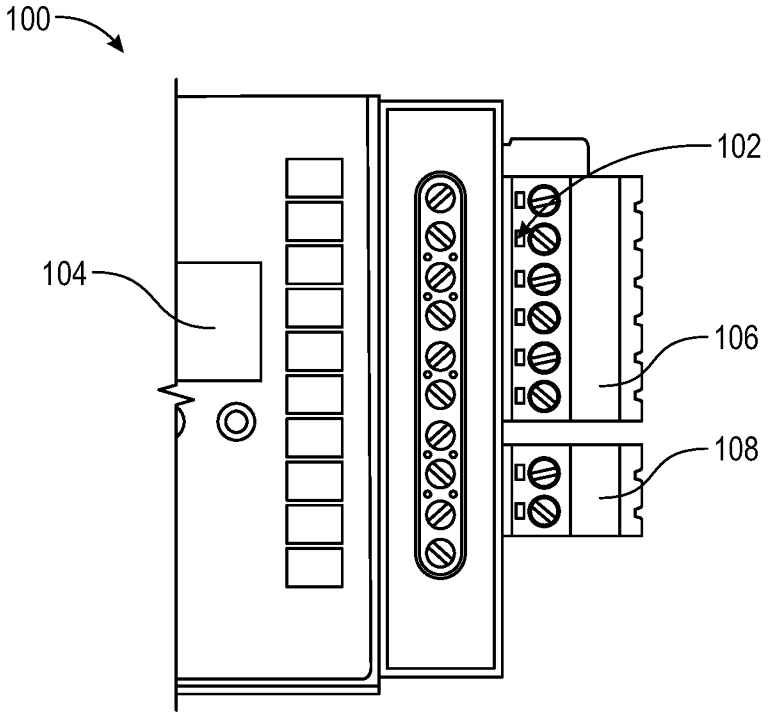
FIG. 2 is an environment in which a Light Emitting Diode (LED) controller and wiring connector implements, in accordance with one embodiment of the present invention.

Turning to the Figures, FIG. 2 shows an environment 100 in which a Light Emitting Diode (LED) controller and wiring connector 102 implements, in accordance with one embodiment of the present invention. LED controller and wiring connector 102 connects in between a LED controller 104 and terminal connectors i.e., at least one first terminal connector 106 and at least one second terminal connector 108. LED controller 104 includes, but not limited to, a 4 channel controller, a 5 channel controller, a 6 channel controller, a 12 channel controller, a 24 channel controller, etc. LED controller 104 is capable of managing single emitter devices, white and hybrid white led ribbon and fixtures, and mixed color RGB/W ribbon and fixtures.

Figure 3:
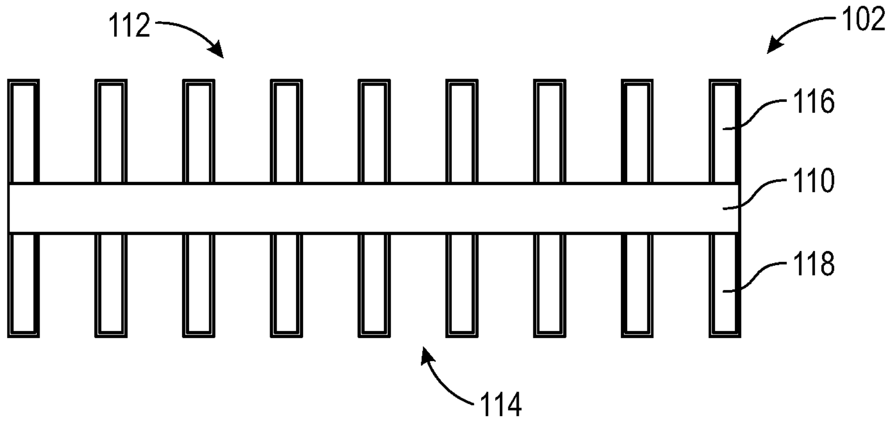
FIG. 3 is a front view of LED controller and wiring connector, in accordance with one embodiment of the present invention.

FIG. 3 shows a front view of LED controller and wiring connector 102, in accordance with one embodiment of the present invention. LED controller and wiring connector 102 includes a bridge or rib 110. Rib 110 is made of non-conductive material. Rib 110 has a first end 112 and a second end 114. First end 112 indicates a top end of rib 110 and a second end 114 indicates a bottom end of rib 110, or vice versa. Rib 110 includes a plurality of first posts or first terminals or first connectors 116. Plurality of first posts 116 extends from rib 110 at first end 112. In one example, plurality of first posts 116 includes nine (9) first posts 116. Further, rib 110 includes a plurality of second posts 118. Plurality of second posts 118 extend from rib 110 at second end 114. In one example, plurality of second posts 118 includes nine (9) first posts 116. In one example, each of first post 116 and second posts 118 includes a male terminal block connector.

Figure 4:
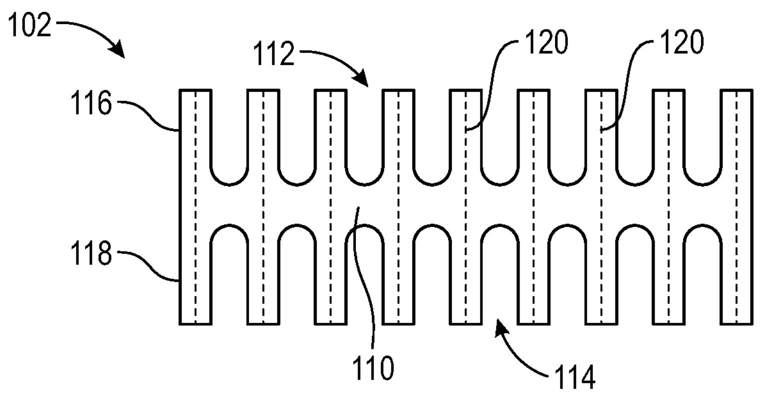
FIG. 4 is an internal trace system of the LED controller and wiring connector, in accordance with one embodiment of the present invention.

FIG. 4 shows internal trace system 120 of LED controller and wiring connector 102, in accordance with one embodiment of the present invention. As can be seen, each plurality of first posts 116 is isolated and traced to plurality of second posts 118. Here, internal trace system 120 allows channel and power distribution from a first post 116 to a second post 118 or vice versa.

Figure 5:
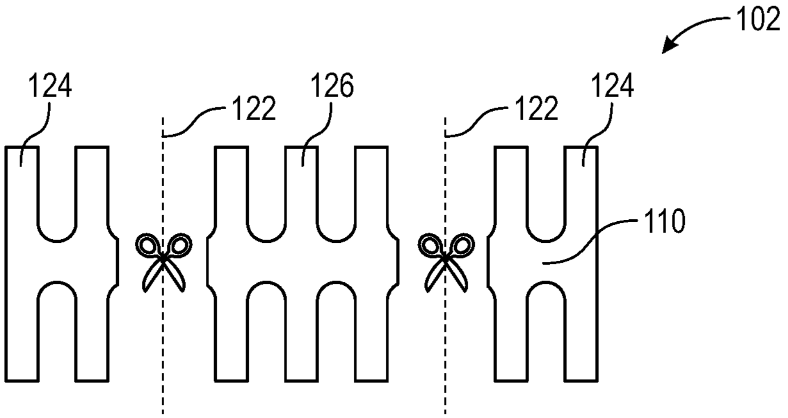
FIG. 5 illustrates the feature of cutting the LED controller and wiring connector, in accordance with one embodiment of the present invention.

In accordance with one embodiment of the present embodiment, LED controller and wiring connector 102 is cut 122 (using flush cutters) into one or more connectors, as shown in FIG. 5. In one example, rib 110 is cut 122 such that LED controller and wiring connector 102 is made into two or more smaller LED controller and wiring connectors, say at least one first wiring connector 124 and at least one second wiring connector 126. First wiring connector 124 is cut 122 to 2-channel connector and second wiring connector 126 is cut 122 to 3-channel connector. A person skilled in the art understands that LED controller and wiring connector 102 presents a series of custom Printed Circuit Board (PCB) breakout boards for use with terminal connectors 106; 108 and LED controller 104 of different types. In one example, terminal connectors 106; 108 include solder type Phoenix screw terminal connectors, interlocking Phoenix screw terminal connectors.

Figure 6A:
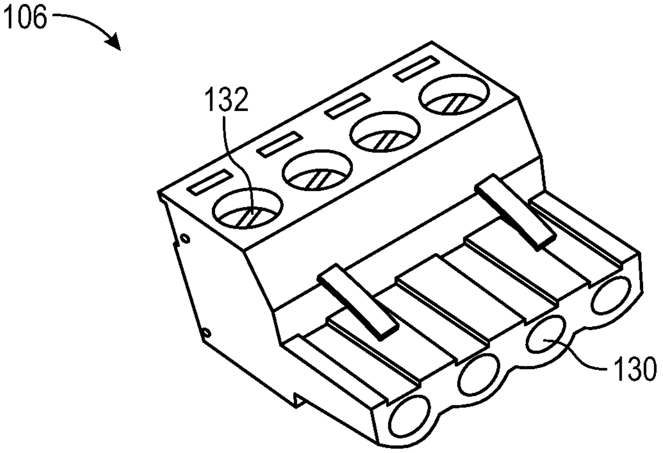
FIG. 6A and FIG. 6B illustrate perspective views of terminal connectors used for connecting the LED controller and wiring connector.
Figure 6B:
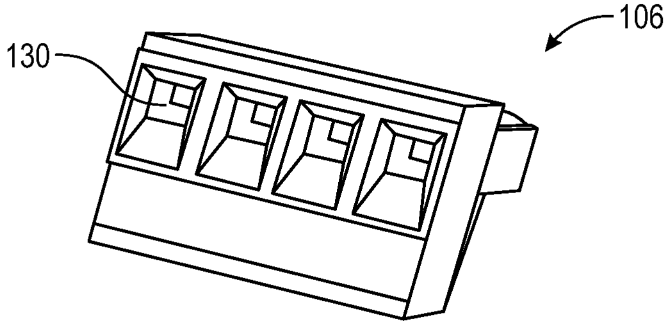
Figure 7:
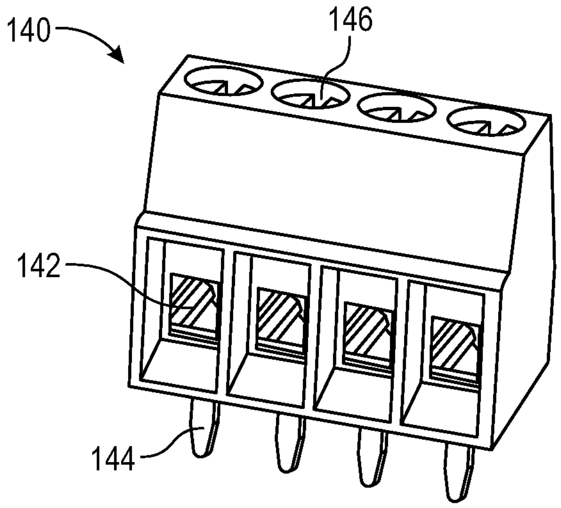
FIG. 7 illustrates a perspective view of another terminal connector for connecting the LED controller and wiring connector.

FIG. 6A and FIG. 6B show perspective views of first terminal connector 106 i.e., interlocking Phoenix screw terminal connectors. First terminal connector 106 indicates a female plug-in screw terminal block connector. In one example, first terminal connector 106 includes a 3-pin or 4-pin female plug-in screw terminal block connector. As can be seen from at least FIG. 6A, first terminal connector 106 includes a 4-pin female members 130 with plug-in screws 132. Similarly, second terminal connector 108 includes a 2-pin female plug-in screw terminal block connector, as shown in FIG. 2, for example. Further, FIG. 7 shows a terminal connector 140 i.e., solder type Phoenix screw terminal connector, in accordance with another embodiment of the present embodiment. Terminal connector 140 operates similarly to first terminal connector 106. Here, terminal connector 140 includes a 4-pin male plug-in screw terminal block connector. As can be seen, terminal connector 140 includes female members 142 for receiving second posts 118, for example. Further, terminal connector 140 includes male connectors 142 for connecting to LED controller 104 or another adapter (not shown), for example. Further, terminal connector 140 includes screws 146 for securing second posts 118 within female members 142.

Figure 9:
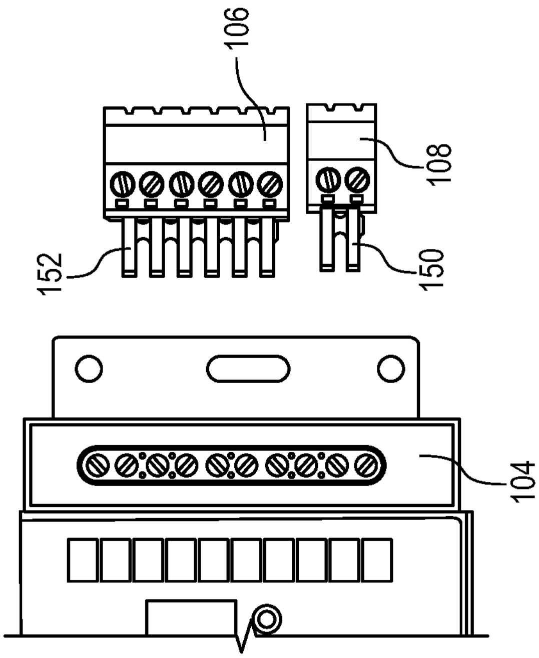
FIG. 8, FIG. 9 and FIG. 10 illustrate the operation of LED controller and wiring connector, in accordance with one embodiment of the present invention.
Figure 10:
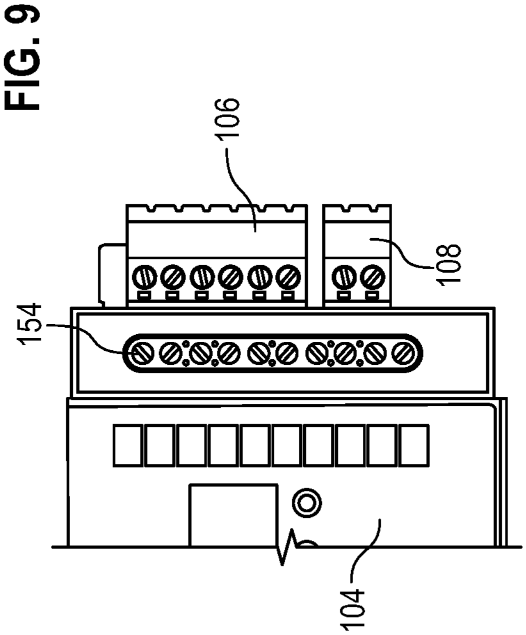
Figure 8:
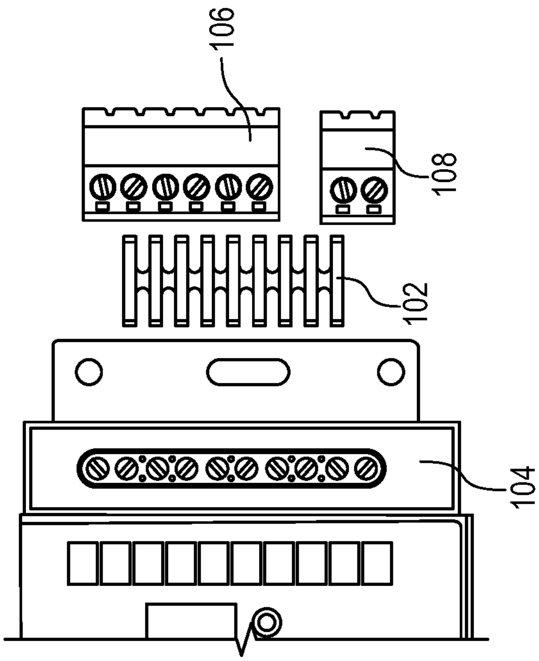

Now referring to FIG. 8, FIG. 9 and FIG. 10, the operation of LED controller and wiring connector 102 is explained. Consider that two first terminal connectors 106 and one second terminal connector 108 need to be connected to LED controller 104 using LED controller and wiring connector 102, as shown in FIG. 8. Here, LED controller and wiring connector 102 is cut into a first wiring connector 150 and a second wiring connector 152, as can be seen from FIG. 9. Here, first wiring connector 150 includes two first posts 116 and two second posts 118. Further, second wiring connector 152 includes six first posts 116 and six second posts 118. After cutting LED controller and wiring connector 102, first terminal connectors 106 and one second terminal connector 108 are connected to first wiring connector 150 and second wiring connector 152, as shown in FIG. 9. Subsequently, first wiring connector 150 and second wiring connector 152 are connected to LED controller 104, as shown in FIG. 10.

From the above, a person skilled in the art understands that LED controller and wiring connector 102 presents a simpler way of connecting terminal connectors 106; 108 to LED controller 104. In other words, LED controller and wiring connector 102 replaces the use of wires and acts as an intermediary to connect terminal connectors 106; 108 to LED controller 104. In order to connect LED controller and wiring connector 102 to terminal connectors 106; 108 and LED controller 104, at first, a user (not shown) loosens set screws on terminal connectors 106; 108. Subsequently, the user plugs LED controller and wiring connector 102 to terminal connectors 106; 108. Further, the user installs LED controller and wiring connector 102 into LED controller 104 and tightens set screws at LED controller 104. The above presents a simple four steps to connect terminal connectors 106; 108 to LED controller 104.

Figure 11:
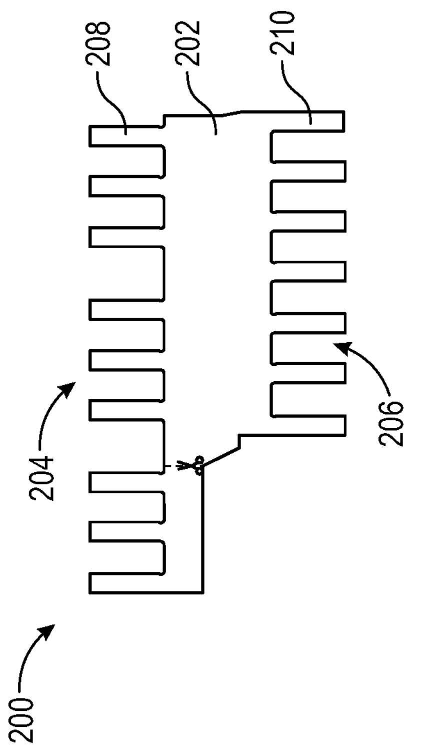
FIG. 11 is a front view of a LED controller and wiring connector, in accordance with another embodiment of the present invention.

Now referring to FIG. 11, a LED controller and wiring connector 200 is shown, in accordance with another embodiment of the present invention. LED controller and wiring connector 200 includes a rib 202. Rib 202 has a first end 204 and a second end 206. First end 204 indicates a top end of rib 202 and a second end 206 indicates a bottom end of rib 202, or vice versa. Rib 202 includes a plurality of first posts 208. Plurality of first posts 208 extends from rib 202 at first end 204. In one example, plurality of first posts 208 include nine (9) first posts 208. Further, rib 202 includes a plurality of second posts 210. Plurality of second posts 210 extends from rib 202 at second end 206. In one example, plurality of second posts 210 includes seven (7) second posts 210. In one example, each of first post 208 and second posts 210 includes a male plug-in screw terminal block connector.

Figure 12:
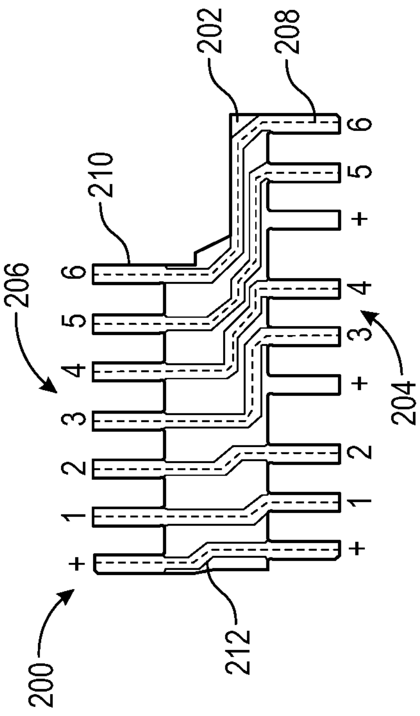
FIG. 12 and FIG. 13 illustrate front and rear views of a trace system of the LED controller and wiring connector, in accordance with one embodiment of the present invention.
Figure 14:
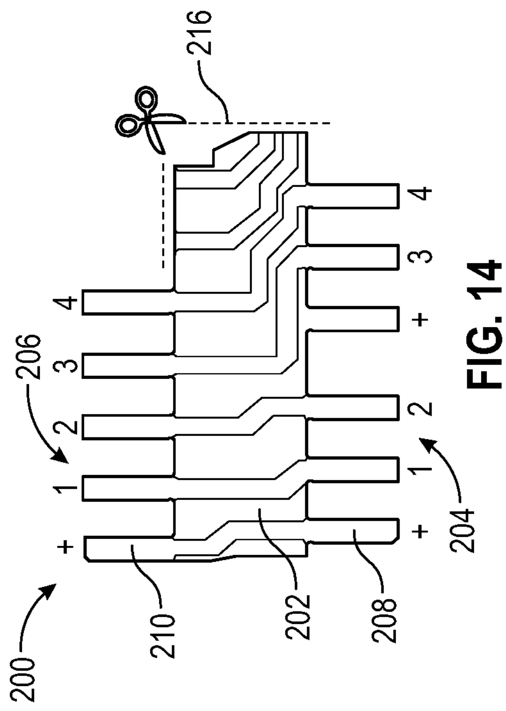
FIG. 14 illustrates the feature of cutting the LED controller and wiring connector, in accordance with one embodiment of the present invention.
Figure 13:
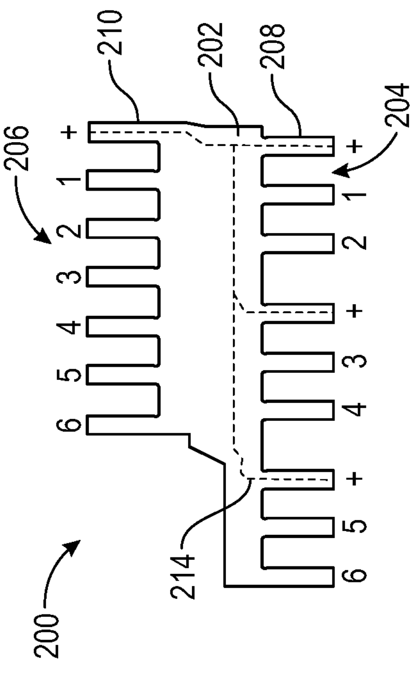

FIG. 12 shows a trace system 212 of LED controller and wiring connector 200 at the front of LED controller and wiring connector 200, in accordance with one embodiment of the present invention. As can be seen, each plurality of first posts 208 is isolated and traced to plurality of second posts 210. Here, trace system 212 allows channel and power distribution from a first post 208 to a second post 210 or vice versa. FIG. 13 shows a trace system 214 at the back of LED controller and wiring connector 200, in accordance with one embodiment of the present invention. In accordance with one embodiment of the present embodiment, LED controller and wiring connector 200 is cut 216 into one or more connectors, as shown in FIG. 14. It should be understood that LED controller and wiring connector 200 can be cut into any configurations depending on the need. FIG. 14 shows an exemplary configuration whereby channels 5, 6 are removed for 4 channel configuration. LED controller and wiring connector 200 includes and operates similarly to LED controller and wiring connector 102, as explained above.

Figure 15:
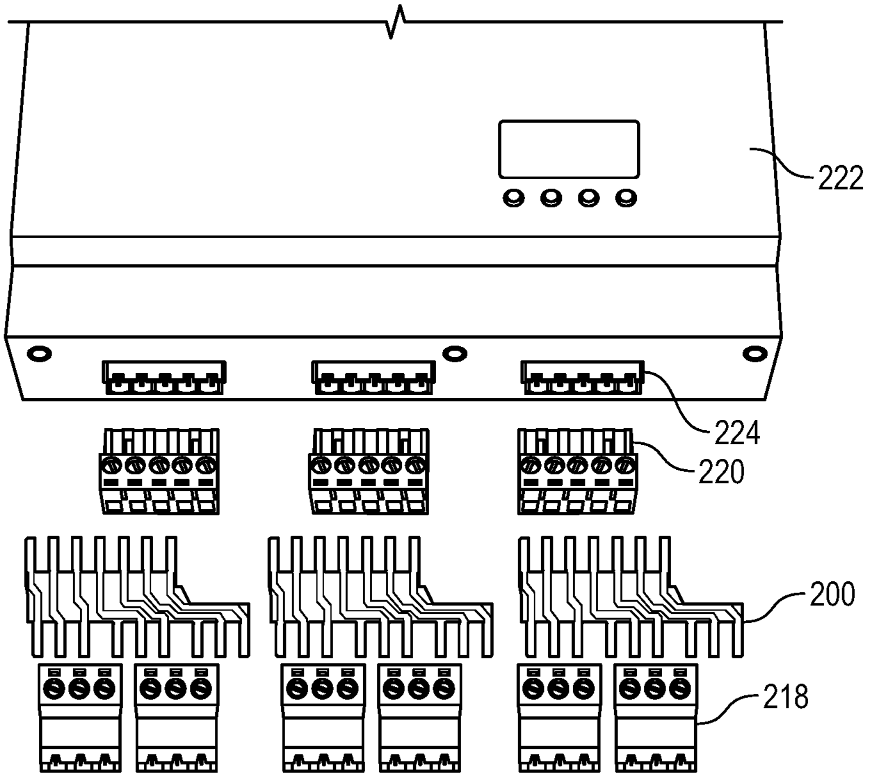
FIG. 15 and FIG. 16 illustrate the feature of connecting the LED controller and wiring connector to 12 channel connector, in accordance with one embodiment of the present invention.
Figure 16:
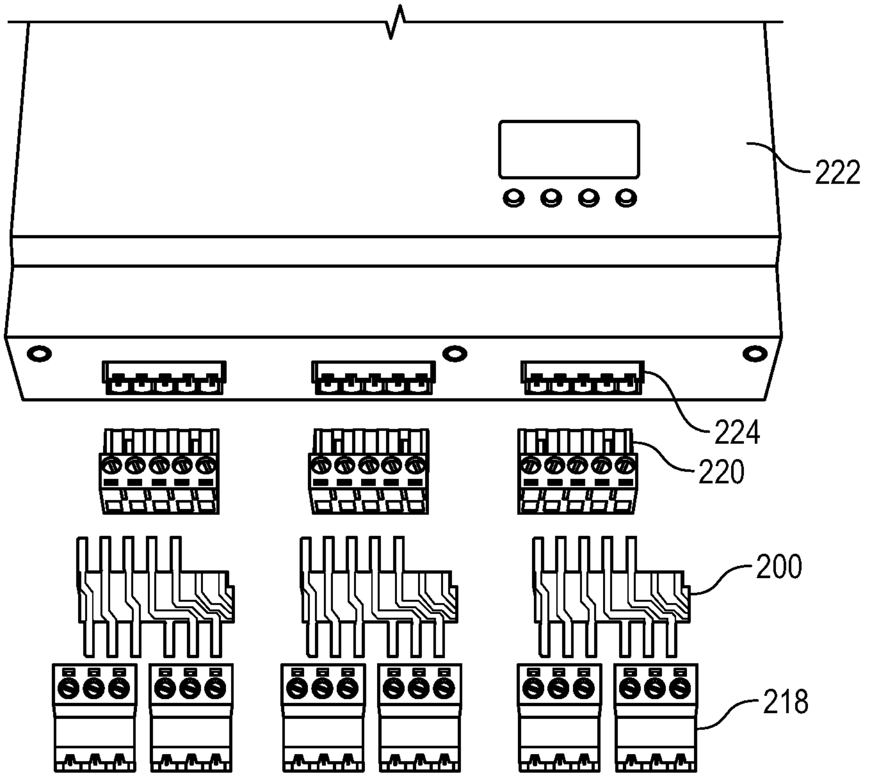

FIG. 15 and FIG. 16 show exemplary embodiments in which a plurality of LED controller and wiring connectors 200 are used to connect to a 12-channel controller 222. Here, plurality of LED controller and wiring connectors 200 align with 3-pin female plug-in screw terminal block connectors 218 and controller terminals adapters 220, as shown in FIG. 15. Controller 222 includes controller terminals 224. In order to connect 3-pin female plug-in screw terminal block connectors 218 to controller 222, at first, LED controller and wiring connectors 200 are cut to fit into controller terminals 224 and 3-pin female plug-in screw terminal block connectors 218, as shown in FIG. 16. Subsequently, controller terminals adapters 220 are connected to controller 222. Further, controller terminals adapters 220 and 3-pin female plug-in screw terminal block connectors 218 are connected to plurality of LED controller and wiring connectors 200.

Figure 17:
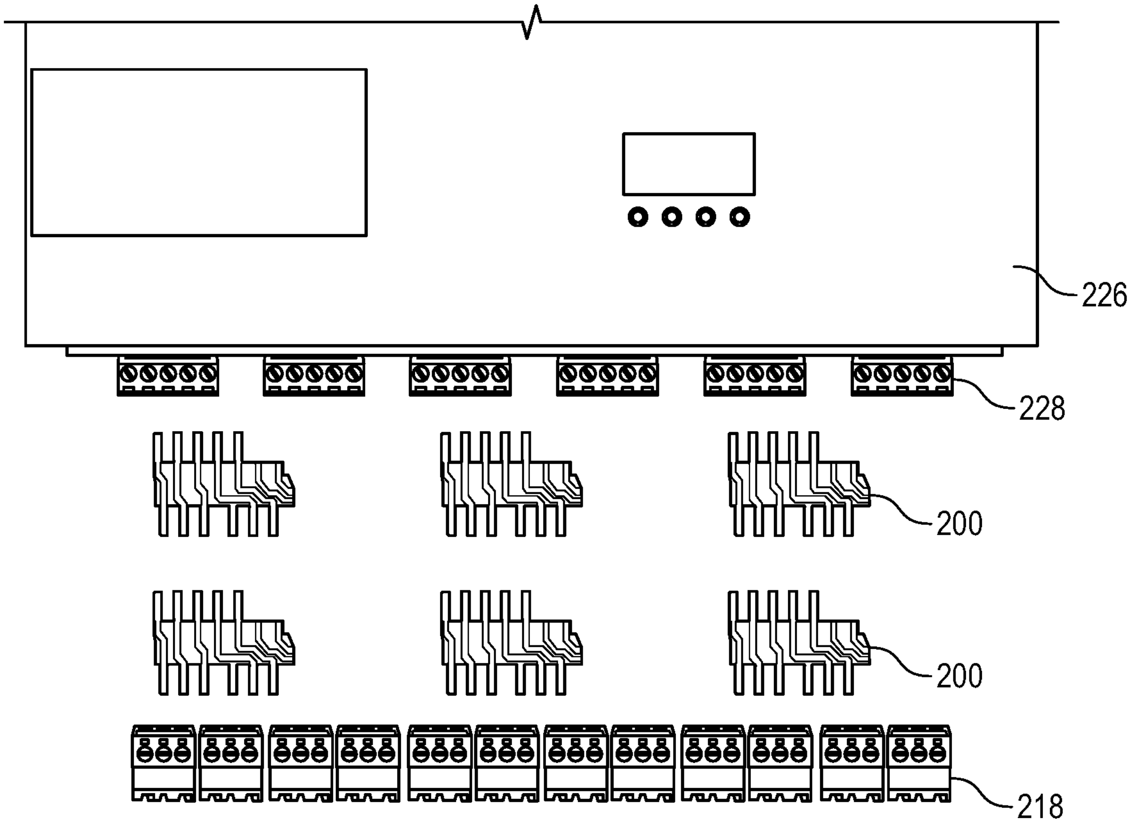
FIG. 17 and FIG. 18 illustrate the feature of connecting the LED controller and wiring connector to 24 channel connector, in accordance with one embodiment of the present invention.
Figure 18:
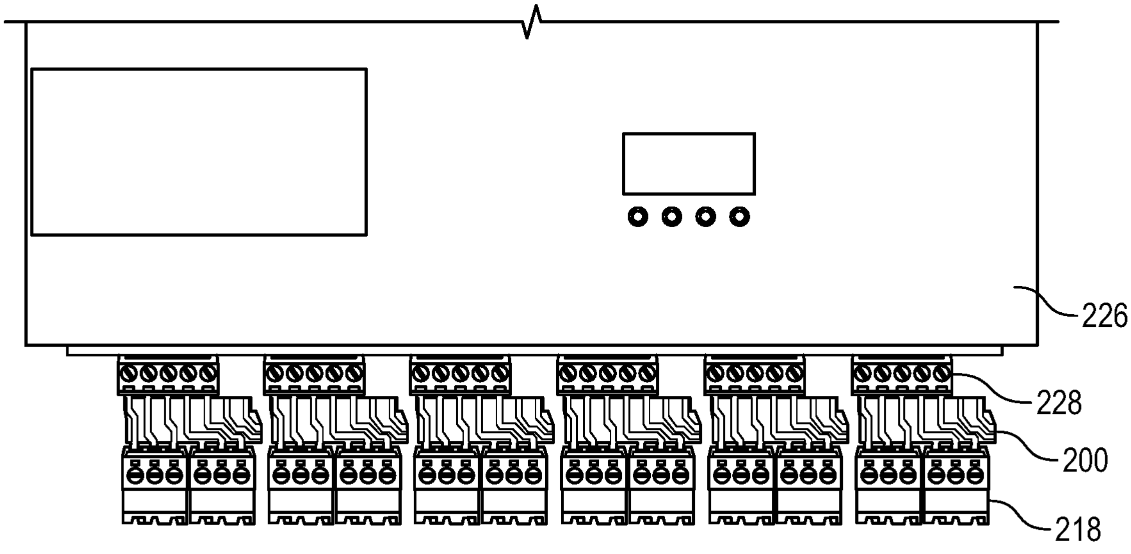

FIG. 17 and FIG. 18 show exemplary embodiments in which a plurality of LED controller and wiring connectors 200 is used to connect to a 24-channel controller 226. Controller 226 includes controller terminals 228. In order to connect 3-pin female plug-in screw terminal block connectors 218 to controller 226, at first, LED controller and wiring connectors 200 are cut to fit into controller terminals 228 and 3-pin female plug-in screw terminal block connectors 218, as shown in FIG. 17. Subsequently, controller terminals 228 and 3-pin female plug-in screw terminal block connectors 218 are connected to plurality of LED controller and wiring connectors 200, as shown in FIG. 18.

Figure 20:
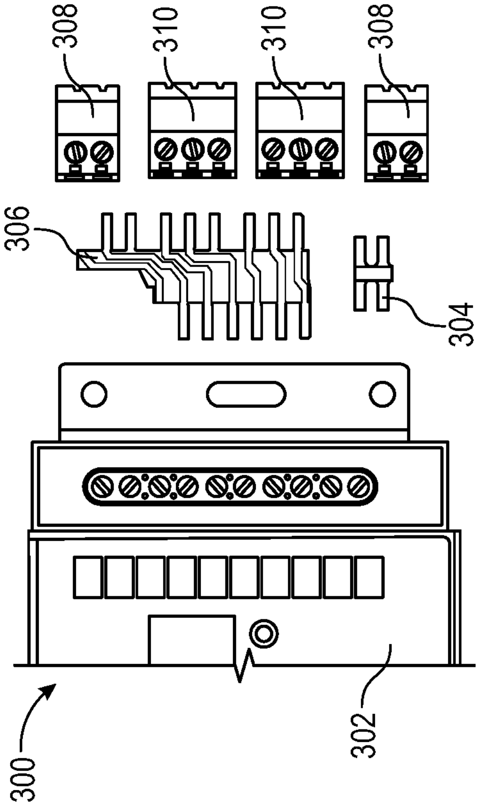
FIG. 19, FIG. 20 and FIG. 21 illustrate the feature of connecting multiple LED controller and wiring connectors to a LED connector and terminal connectors, in accordance with one embodiment of the present invention.
Figure 19:
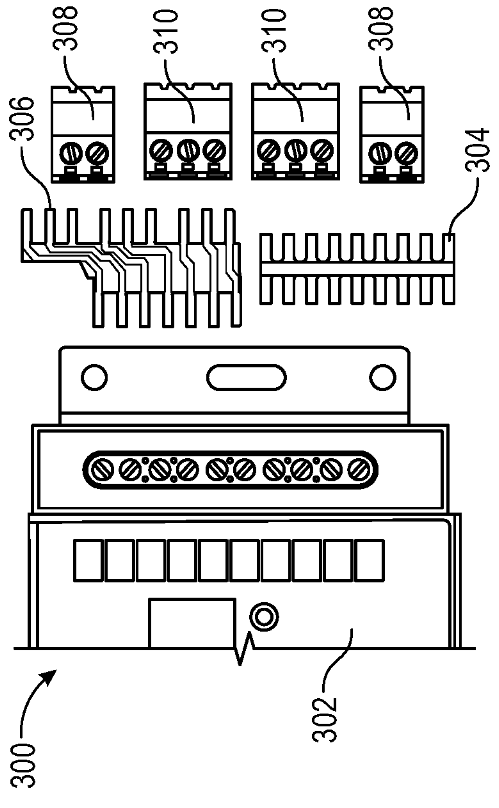
Figure 21:
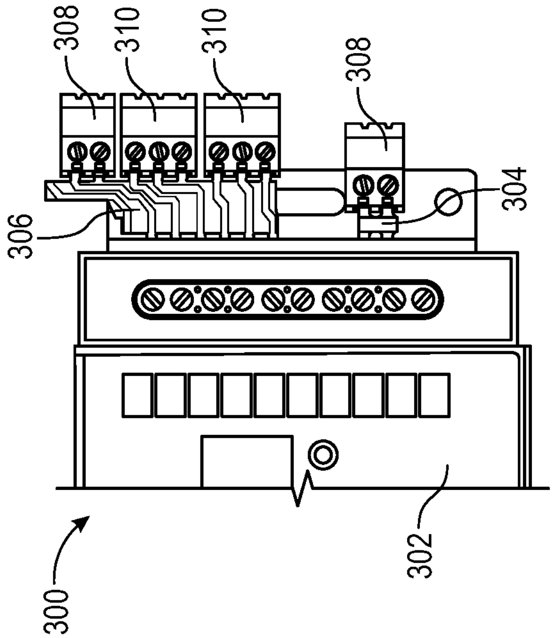

Now referring to FIG. 19, FIG. 20 and FIG. 21, an environment 300 in which a controller 302 is connected using two different LED controller and wiring connectors 304; 306 are shown, in accordance with another embodiment of the present invention. Here, LED controller and wiring connectors 304; 306 (i.e., first LED controller and wiring connectors 304 (similar to LED controller and wiring connectors 100) and second LED controller and wiring connectors 306 (similar to LED controller and wiring connectors 200)) are used to connect one or more 2-pin female plug-in screw terminal block connectors 308 and 3-pin female plug-in screw terminal block connectors 310, as shown in FIG. 19. Each of first LED controller and wiring connectors 304 and second LED controller and wiring connectors 306 are cut to connect 2-pin female plug-in screw terminal block connectors 308 and 3-pin female plug-in screw terminal block connectors 310, as shown in FIG. 20. Subsequently, 2-pin female plug-in screw terminal block connectors 308 and 3-pin female plug-in screw terminal block connectors 310 are connected to first LED controller and wiring connectors 304 and second LED controller and wiring connectors 306. Further, first LED controller and wiring connectors 304 and second LED controller and wiring connectors 306 are connected to controller 302, as shown in FIG. 21.

Figure 22:
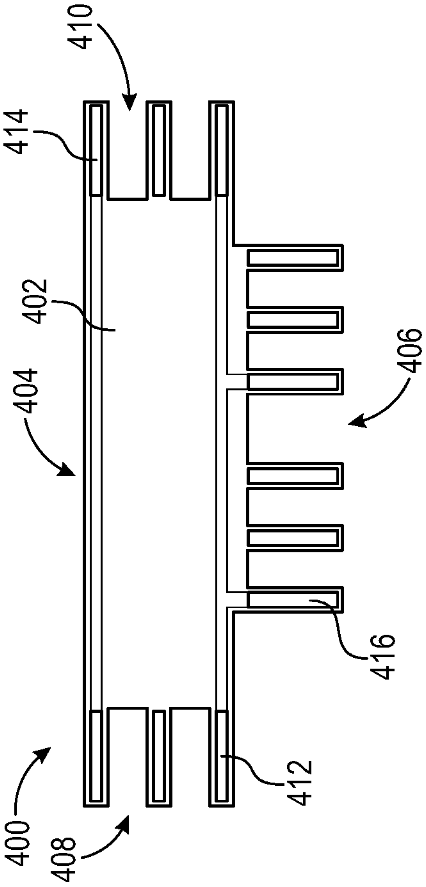
FIG. 22 is a front view of a LED controller and wiring connector, in accordance with another embodiment of the present invention.

Now referring to FIG. 22, a front view of a LED controller and wiring connector 400 is shown, in accordance with yet another embodiment of the present invention. LED controller and wiring connector 400 includes a rib 402. Rib 402 has a first end 404, a second end 406, a first side 408 and a second side 410. First end 404 indicates a top end of rib 402 and a second end 406 indicates a bottom end of rib 402, or vice versa. First side 408 indicates a left side and second side 410 indicates a right side of rib 402, or vice versa. Rib 402 includes a plurality of first posts 412. Plurality of first posts 412 extends from rib 402 at first side 408. In one example, plurality of first posts 412 include three (3) first posts 412. Further, rib 402 includes a plurality of second pots 414. Plurality of second posts 414 extends from rib 402 at second side 410. In one example, plurality of second posts 414 include three (3) second posts 414. Further, rib 402 includes a plurality of third posts 416. Plurality of third posts 416 extends from rib 402 at second end 406. In one example, plurality of third posts 416 include three (3) third posts 416. In one example, each of first post 412, second post 414 and third post 416 includes a male terminal block connector.

Figure 23:
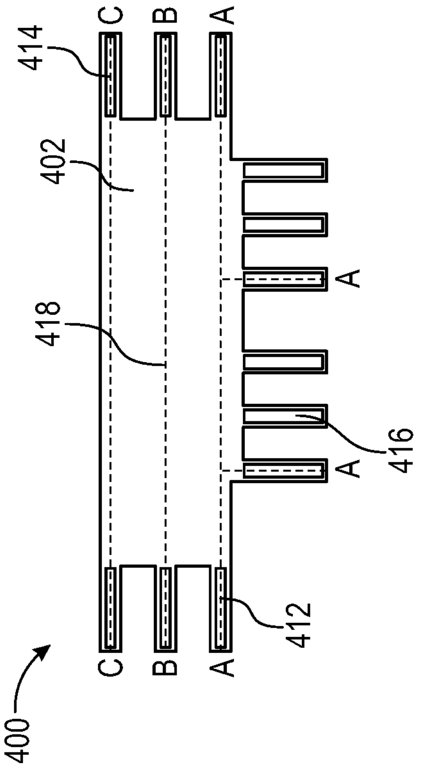
FIG. 23 and FIG. 24 illustrate front and rear views of a trace system of the LED controller and wiring connector, in accordance with one embodiment of the present invention.
Figure 24:
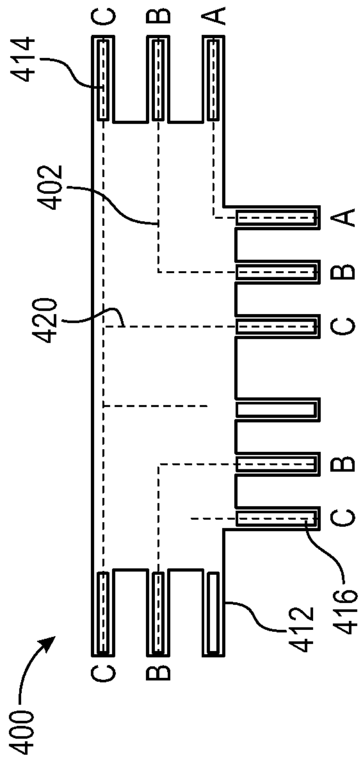
Figure 25:
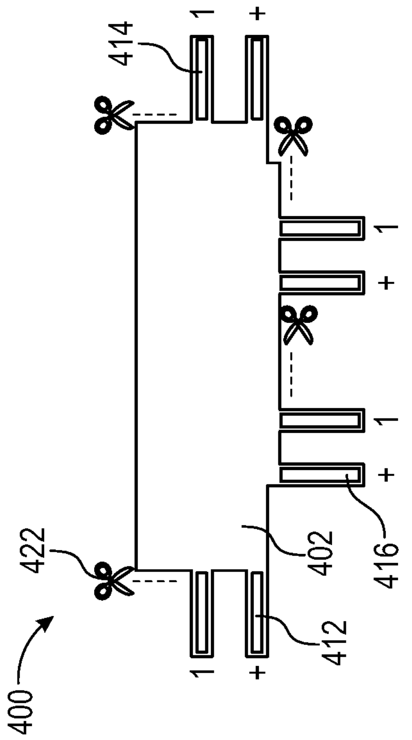
FIG. 25 illustrates the feature of cutting the LED controller and wiring connector, in accordance with one embodiment of the present invention.

FIG. 23 shows a trace system 418 at the front of LED controller and wiring connector 400, in accordance with one embodiment of the present invention. FIG. 24 shows a trace system 420 at the rear of LED controller and wiring connector 400, in accordance with another embodiment of the present invention. In accordance with one embodiment of the present embodiment, LED controller and wiring connector 400 is cut 422 to create a 2-single channel splitter, as shown in FIG. 25.

Figure 27:
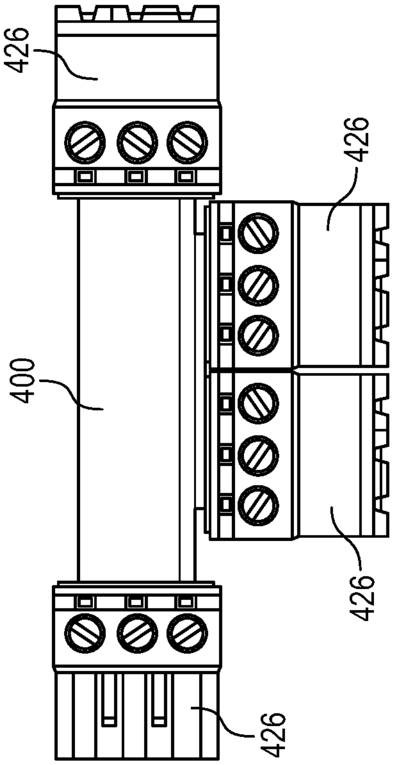
FIG. 26, FIG. 27 and FIG. 28 illustrate the feature of connecting multiple LED controller and wiring connectors to a LED connector and terminal connectors, in accordance with one embodiment of the present invention.
Figure 26:
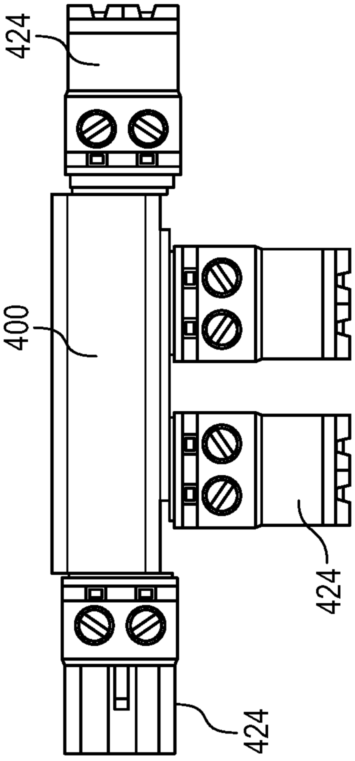
Figure 28:
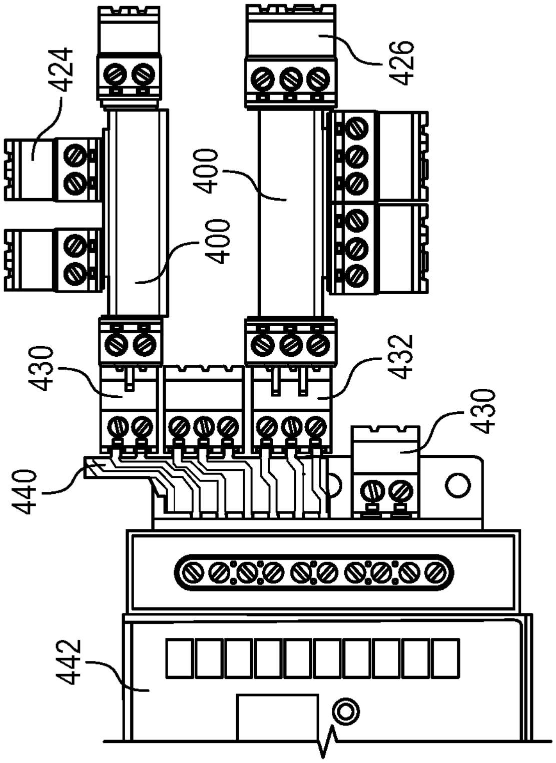

FIG. 26 shows LED controller and wiring connector 400 cut to create a single channel splitter. Here, LED controller and wiring connector 400 connects to 2-pin female plug-in screw terminal block connectors 424. FIG. 27 shows LED controller and wiring connector 400 cut to create a 3 channel splitter. Here, LED controller and wiring connector 400 connects to 3-pin female plug-in screw terminal block connectors 426. Further, FIG. 28 shows a plurality of LED controller and wiring connectors 400 connected to 2-pin female plug-in screw terminal block connectors 424 and 3-pin female plug-in screw terminal block connectors 426. 2-pin female plug-in screw terminal block connectors 424 further connects to first terminal connectors 430. 3-pin female plug-in screw terminal block connectors 432 further connects to second terminal connectors 432. First terminal connectors 430 and second terminal connectors 432 connect to a second LED controller and wiring connector 440 (similar to LED controller and wiring connectors 200). Second LED controller and wiring connector 440 connects to a LED controller 442.

Figure 29:
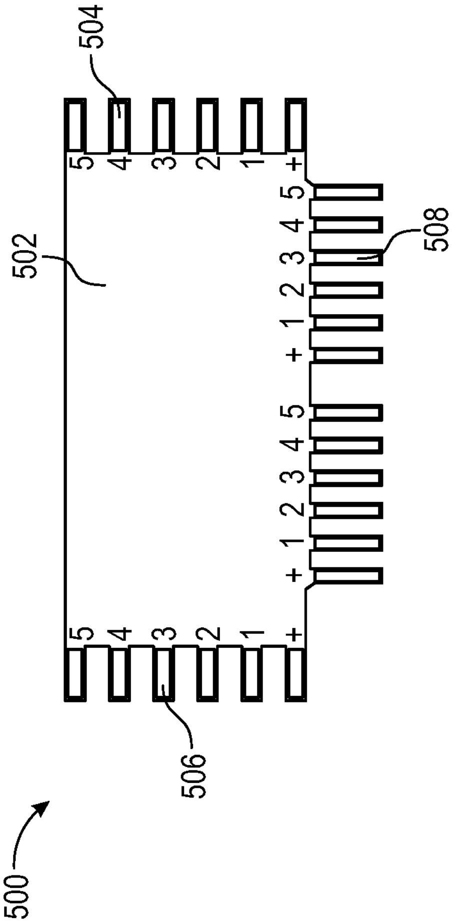
FIG. 29 is a front view of a LED controller and wiring connector, in accordance with yet another embodiment of the present invention.

Now referring to FIG. 29, a LED controller and wiring connector 500 is shown, in accordance with another embodiment of the present invention. LED controller and wiring connector 500 includes a rib 502. Rib 502 includes a plurality of first posts 504 and a plurality of second posts 506, each extending in opposite sides. As can be seen, each of plurality of first posts 504 and plurality of second posts 506 includes at least six (6) posts. Further, rib 502 includes a plurality of third posts 508. Plurality of third posts 508 extends perpendicularly from each of plurality of first posts 504 and plurality of second posts 506. In one example, plurality of third posts 508 includes a pair of at least six (6) posts (total 12 posts, each pair separated by a gap/space). Each of first post 504, second post 506 and third post 508 includes a male plug-in screw terminal block connector.

Figure 31:
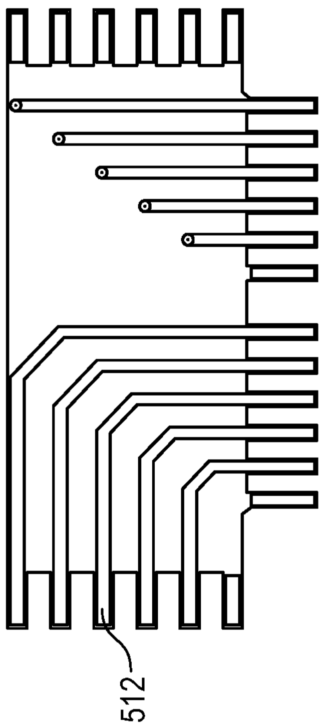
FIG. 30 and FIG. 31 illustrate front and rear views of a trace system of the LED controller and wiring connector, in accordance with one embodiment of the present invention.
Figure 30:
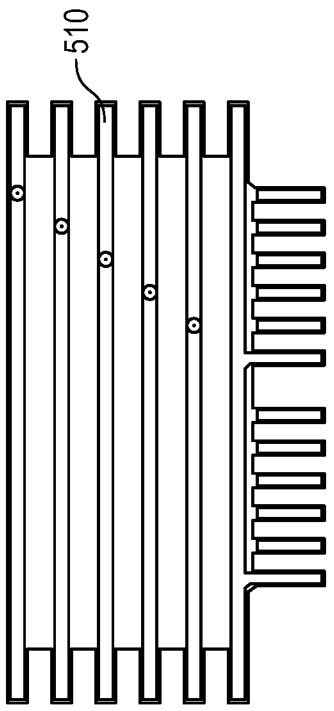

FIG. 30 shows a trace system 510 at the front of LED controller and wiring connector 500, in accordance with one embodiment of the present invention. FIG. 31 shows a trace system 512 at the rear of LED controller and wiring connector 500, in accordance with another embodiment of the present invention. Trace systems 510, 512 allow channel and power distribution from plurality of first posts 504 and/or plurality of second posts 506 to plurality of third posts 508. In one example, trace systems 510, 512 present a series or predefined connection from a first post 504 of plurality of first posts 504 and/or a second post 506 of plurality of second posts 506 to a third post 506 of plurality of third posts 508.

Figure 32:
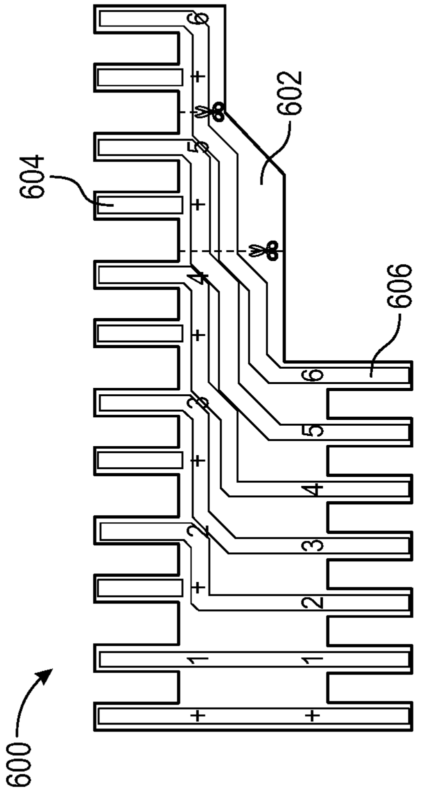
FIG. 32 is a front view of a LED controller and wiring connector, in accordance with yet another embodiment of the present invention.

In accordance with the present invention, one or more of plurality of first posts 504, one or more of plurality of second posts 506 and one or more of plurality of third posts 508 are cut to connect to a 2-pin or 3-pin female plug-in screw terminal block connectors or a LED controller (not shown, similar to controller 226 shown above). A person skilled in the art understands that each of plurality of first posts 504, plurality of second posts 506 and plurality of third posts 508 can be cut in order to connect to 2 or more female plug-in screw terminal block connectors or terminal connectors without departing from the scope of the present invention. Now referring to FIG. 32, a LED controller and wiring connector 600 is shown, in accordance with another embodiment of the present invention. LED controller and wiring connector 600 includes a rib 602. Rib 602 includes a plurality of first posts 604 and a plurality of second posts 606, each extending in opposite sides. As can be seen, plurality of first posts 604 includes at least twelve (12) posts and plurality of second posts 606 includes at least seven (7) posts.

Figure 33:
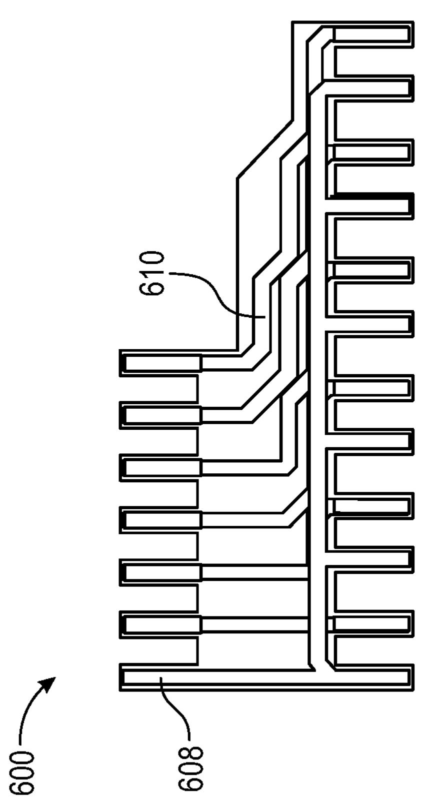
FIG. 33 is an overlaid trace system of the LED controller and wiring connector, in accordance with yet another embodiment of the present invention.
Figure 34:
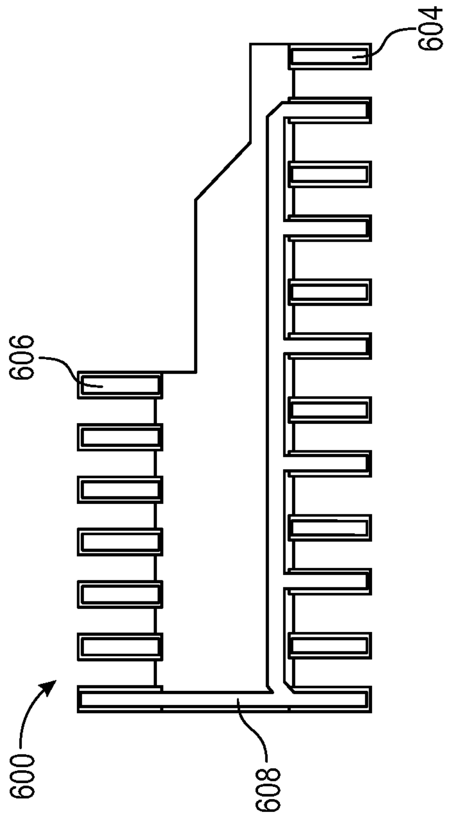
FIG. 34 and FIG. 35 illustrate front and rear views of the trace system of the LED controller and wiring connector, in accordance with one embodiment of the present invention.
Figure 35:
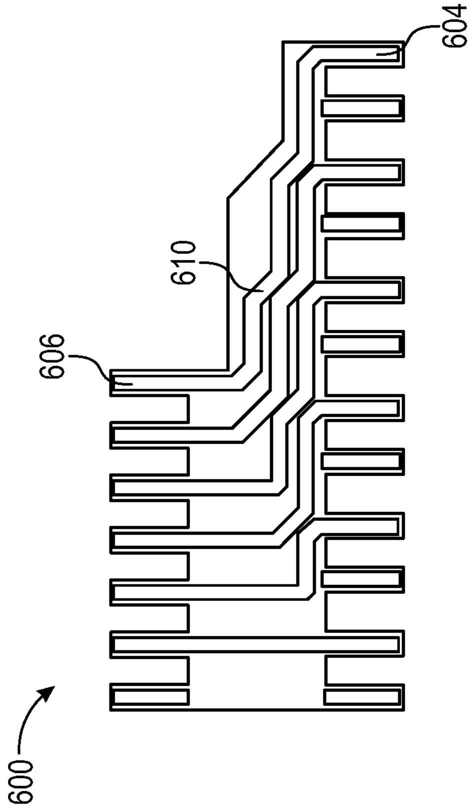

FIG. 33 shows an overlaid trace system comprising a first layer 608 and a second layer 610, in accordance with one embodiment of the present invention. FIG. 34 shows first layer 608 at the front of LED controller and wiring connector 600. Further, FIG. 35 shows second layer 610 at the rear of LED controller and wiring connector 600. Trace systems 608, 610 allow channel and power distribution from plurality of first posts 604 to plurality of second posts 606. In one example, trace systems 608, 610 present a series or predefined connection from a first post 604 of plurality of first posts 604 to a second post 606 of plurality of second posts 606, or vice versa.

In accordance with the present invention, one or more of plurality of first posts 604, and one or more of plurality of second posts 606 are cut to connect to a 2-pin or 3-pin female plug-in screw terminal block connectors or a LED controller (not shown, similar to controller 226 shown above). A person skilled in the art understands that each of plurality of first posts 604, and plurality of second posts 606 can be cut in order to connect to 2 or more female plug-in screw terminal block connectors or terminal connectors without departing from the scope of the present invention.

From the above, it is evident that the presently disclosed LED controller and wiring connector can come in various configurations to connect to LED controller and terminal connectors depending on the need. The LED controller and wiring connector presents a series of custom PCB breakout boards for use with 5.08 mm Phoenix type terminal block connectors and provides an improved connector for wiring. The LED controller and wiring connector can be used with LED controllers for managing single emitter devices, white and hybrid white led ribbon and fixtures, and mixed color RGB/W ribbon and fixtures. The presently disclosed LED controller and wiring connector can be configured to use with any terminal connector adapters for both power and lighting control output.

The LED controller and wiring connector provides several advantages over prior art. In the prior art, typically the wires are cut first and separated individually. Further, each wire is stripped and wire ferrules are prepared. The ferrules are loaded and crimped. Subsequently, the screws are loosened and wires are installed into terminal connector plug terminals. Further, the wires are installed to controller terminals and screws are tightened. On the other hand, using the presently disclosed LED controller and wiring connector, the screws are loosened. Subsequently, the terminal connectors are installed to the LED controller and wiring connector. Further, the LED controller and wiring connector is installed into the LED controller and screws are tightened at the LED controller. When compared with prior art, the presently disclosed LED controller and wiring connector presents the number of steps in installing the terminal connectors to the LED controller.

The LED controller and wiring connector requires fewer components i.e., a screwdriver and Phoenix connectors to connect to the LED controller. Since the LED controller and wiring connector requires fewer parts/tools, it takes less time and minimum level of skill in connecting the LED controller and wiring connector to the LED controller and terminal connectors. The LED controller and wiring connector does not use wires. As such, the LED controller and wiring connector does not produce wire related waste products such as rubbers, plastics, and copper strands.

It would be apparent to those having skill in the art that the sizes of the connectors and the number of connectors (one, two, three, four, five, six, seven, or more) would also work, without detracting from the spirit of the invention, and those having ordinary skill in the art would know how to modify the size and number.

Clause 1. A Light Emitting Diode (LED) controller and wiring connector, comprising: a rib; a plurality of first posts, wherein said plurality of first posts extends from a first end of said rib; and, a plurality of second posts, wherein said plurality of second posts extends from a second end of said rib; wherein said second end is opposite of said first end, wherein said plurality of first posts and said plurality of second posts comprise a plurality of trace systems capable of allowing channel and power distribution from said plurality of first posts to said plurality of second posts.

Clause 2. The LED controller and wiring connector of Clause 1, wherein a trace system of said plurality of trace systems comprises a series connection from a first post of said plurality of first posts to a second post of said plurality of second posts.

Clause 3. The LED controller and wiring connector of Clause 1, wherein a trace system of that plurality of trace systems comprises a predefined connection from a first post of said plurality of first posts to a second post of said plurality of second posts.

Clause 4. The LED controller and wiring connector of Clause 1, wherein one or more first posts of said plurality of first posts are cut to connect to a LED controller, and wherein one or more second posts of said plurality of second posts are cut to connect to terminal connectors.

Clause 5. The LED controller and wiring connector of Clause 4, wherein said LED controller comprises one of a 4 channel controller, a 5 channel controller, a 6 channel controller, a 12 channel controller, and a 24 channel controller.

Clause 6. The LED controller and wiring connector of Clause 4, wherein a terminal connector of said terminal connectors comprise at least two pin female plug-in screw terminal block connector.

Clause 7. The LED controller and wiring connector of Clause 1, wherein each of said plurality of first posts and said plurality of second posts comprises a male terminal connector.

Clause 8. A Light Emitting Diode (LED) controller and wiring connector, comprising: a rib; a plurality of first posts, wherein said plurality of first posts extends from a first side of said rib; a plurality of second posts, wherein said plurality of second posts extends from a second side of said rib, wherein said second side is opposite of said first side; and a plurality of third posts, wherein said plurality of third posts extends from said rib perpendicularly to said plurality of first posts and said plurality of second posts, wherein said plurality of first posts, said plurality of second posts and said plurality of third posts comprise a plurality of trace systems capable of allowing channel and power distribution from said plurality of first posts and said plurality of second posts to said plurality of third posts.

Clause 9. The LED controller and wiring connector of Clause 8, wherein a trace system of said plurality of trace systems comprises a series connection from one of a first post of said plurality of first posts and a second post of said plurality of second posts to a third post of said plurality of third posts.

Clause 10. The LED controller and wiring connector of Clause 8, wherein a trace system of said plurality of trace systems comprises a predefined connection from one of a first post of said plurality of first posts and a second post of said plurality of second posts to a third post of said plurality of third posts.

Clause 11. The LED controller and wiring connector of Clause 8, wherein one or more first posts of said plurality of first posts, one or more second posts of said plurality of second posts, and one or more third posts of said plurality of third posts are cut to connect to a LED controller and terminal connectors.

Clause 12. The LED controller and wiring connector of Clause 11, wherein the LED controller comprises one of a 4 channel controller, a 5 channel controller, a 6 channel controller, a 12 channel controller, and a 24 channel controller.

Clause 13. The LED controller and wiring connector of Clause 11, wherein a terminal connector of said terminal connectors comprises at least two pin female plug-in screw terminal block connector.

Clause 14. The LED controller and wiring connector of Clause 11, wherein a terminal connector of said terminal connectors comprises a three pin female plug-in screw terminal block connector.

Clause 15. The LED controller and wiring connector of Clause 8, wherein each of said plurality of first posts, said plurality of second posts and said plurality of third posts comprises a male terminal connector.

Clause 16. A method of providing a Light Emitting Diode (LED) controller and wiring connector, the method comprising steps of: providing a rib; providing a plurality of first posts extending from a first end of said rib; providing a plurality of second posts extending from a second end of said rib, said second end being opposite of said first end; and providing a plurality of trace systems between said plurality of first posts and said plurality of second posts for allowing channel and power distribution from said plurality of first posts to said plurality of second posts.

Clause 17. The method of Clause 16, further comprising: cutting one or more first posts of said plurality of first posts to connect to a LED controller; and cutting one or more second posts of said plurality of second posts to connect to a plurality of terminal connectors.

Clause 18. The method of claim 16, further comprising providing a series connection from a first post of said plurality of first posts to a second post of said plurality of second posts for the channel and power distribution.

Clause 19. The method of Clause 16, further comprising providing a predefined connection from a first post of said plurality of first posts to a second post of said plurality of second posts for the channel and power distribution.

Clause 20. The method of Clause 17, further comprising: providing said plurality of terminal connectors comprising at least two pin female plug-in screw terminal block connector; and providing each of said plurality of first posts and said plurality of second posts comprising a male terminal connector.

While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

What is claimed is:

1. A Light Emitting Diode (LED) controller and wiring connector, comprising:

a rib;

a plurality of first posts, wherein said plurality of first posts extends from a first end of said rib; and, a plurality of second posts, wherein said plurality of second posts extends from a second end of said rib;

wherein said second end is opposite of said first end, wherein said plurality of first posts and said plurality of second posts comprise a plurality of trace systems capable of allowing channel and power distribution from said plurality of first posts to said plurality of second posts;

wherein one or more first posts of said plurality of first posts are cut to connect to a LED controller, and wherein one or more second posts of said plurality of second posts are cut to connect to terminal connectors.

2. The LED controller and wiring connector of claim 1, wherein a trace system of said plurality of trace systems comprises a series connection from a first post of said plurality of first posts to a second post of said plurality of second posts.

3. The LED controller and wiring connector of claim 1, wherein a trace system of the plurality of trace systems comprises a predefined connection from a first post of said plurality of first posts to a second post of said plurality of second posts.

4. The LED controller and wiring connector of claim 1, wherein said LED controller comprises one of a 4 channel controller, a 5 channel controller, a 6 channel controller, a 12 channel controller, and a 24 channel controller.

5. The LED controller and wiring connector of claim 1, wherein a terminal connector of said terminal connectors comprise at least two pin female plug-in screw terminal block connector.

6. The LED controller and wiring connector of claim 1, wherein each of said plurality of first posts and said plurality of second posts comprises a male terminal connector.

7. A Light Emitting Diode controller and wiring connector, comprising:

a rib;

a plurality of first posts, wherein said plurality of posts extends from a first side of said rib;

a plurality of second posts, wherein said plurality of second posts extends from a second side of said rib, wherein said second side is opposite of said first side; and a plurality of third posts, wherein said plurality of third posts extends from said rib perpendicularly to said plurality of first posts and said plurality of second posts, wherein said plurality of first posts, said plurality of second posts and said plurality of third posts comprise a plurality of trace systems capable of allowing channel and power distribution from said plurality of first posts and said plurality of second posts to said plurality of third posts.

8. The LED controller and wiring connector of claim 7, wherein a trace system of said plurality of race systems comprises a series connection from one of a first post of said plurality of first posts and a second post of said plurality of second posts to a third post of said plurality of third posts.

9. The LED controller and wiring connector of claim 7, Wherein a trace system of said plurality of trace systems comprises a predefined connection from one of a first post of said plurality of first posts and a second post of said plurality of second posts to a third post of said plurality of third posts.

10. The LED controller and wiring connector of claim 7, wherein one or more first posts of said plurality of first posts, one or more second posts of said plurality of second posts, and one or more third posts of said plurality of third posts are cut to connect to a LED controller and terminal connectors.

11. The LED controller and wiring connector of claim 10, wherein the LED controller comprises one of a 4 channel controller, a 5 channel controller, a channel controller, a 12 channel controller, and a 24 channel controller.

12. The LED controller and wiring connector of claim 10, wherein a terminal connector of said terminal connectors comprises at least two pin female plug-in screw terminal block connector.

13. The LED controller and wiring connector of claim 10, wherein a terminal connector of said terminal connectors comprises a three pin female plug-in screw terminal block connector.

14. The LED controller and wiring connector of claim 7, therein each of said plurality of first posts, said plurality of second posts and said plurality of third posts comprises a male terminal connector.

15. A method of providing a Light Emitting Diode (LED) controller and wiring connector, the method comprising steps of:

providing a rib;

providing a plurality of first posts extending from a first end of said rib;

providing a plurality of second posts extending from a second end of said rib, said second end being opposite of said first end;

providing a plurality of trace systems between said plurality of first posts and said plurality of second posts for allowing channel and power distribution from said plurality of first posts to said plurality of second posts;

cutting one or more first posts of said plurality of first posts to connect to a LED controller; and cutting one or more second of said plurality of second posts to connect to a plurality of terminal connectors.

16. The method of claim 15, further comprising providing a series connection from a first post of said plurality of first posts to a second post of said plurality of second posts for the channel and power distribution.

17. The method of claim 15, further comprising providing a predefined connection from a first post of said plurality of first posts to a second post of said plurality of second posts for the channel and power distribution.

18. The method of claim 15, further comprising:

providing said plurality of terminal connectors comprising at least two pin fen a plug-in screw terminal block connector; and providing each of said plurality of first posts and said plurality of second posts comprising a male terminal connector.

* * * * *